(12) United States Patent
Foucart-Gaudy et al.

(10) Patent No.: US 12,038,036 B2
(45) Date of Patent: Jul. 16, 2024

(54) SEAL WITH SKIRT

(71) Applicant: Airbus Operations S.A.S., Toulouse (FR)

(72) Inventors: Simon Foucart-Gaudy, Toulouse (FR); Vincent Delpy, Toulouse (FR); Gerard Millet, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 65 days.

(21) Appl. No.: 17/477,981

(22) Filed: Sep. 17, 2021

(65) Prior Publication Data

US 2022/0106978 A1 Apr. 7, 2022

(30) Foreign Application Priority Data

Oct. 7, 2020 (FR) ....................................... 2010254

(51) Int. Cl.
| | |
|---|---|
| *F16B 43/02* | (2006.01) |
| *F16B 43/00* | (2006.01) |
| *F16J 15/02* | (2006.01) |
| *F16B 5/02* | (2006.01) |

(52) U.S. Cl.
CPC ........... *F16B 43/001* (2013.01); *F16J 15/022* (2013.01); *F16B 5/02* (2013.01)

(58) Field of Classification Search
CPC .......... F16B 5/02; F16B 43/001; F16J 15/022
USPC ....................................................... 411/542
See application file for complete search history.

(56) References Cited

U.S. PATENT DOCUMENTS

| | | | | |
|---|---|---|---|---|
| 2,843,102 | A * | 7/1958 | Duesenberg | F16B 43/001 123/188.1 |
| 3,910,588 | A | 10/1975 | Austin | |
| 4,712,802 | A * | 12/1987 | Hewison | F16B 43/001 277/648 |
| 5,183,267 | A * | 2/1993 | Ackerman | F16J 15/06 277/630 |
| 5,201,625 | A * | 4/1993 | Takenouchi | H01R 13/6215 439/364 |
| 5,765,819 | A * | 6/1998 | Hummel | F16F 1/3735 267/293 |
| 9,206,901 | B2 * | 12/2015 | Kurose | F16J 15/126 |
| 10,480,202 | B1 * | 11/2019 | Colino Vega | E04G 11/06 |

(Continued)

FOREIGN PATENT DOCUMENTS

| | | |
|---|---|---|
| AU | 713351 B3 | 12/1999 |
| CA | 1031383 A | 5/1978 |

(Continued)

OTHER PUBLICATIONS

Search Report for Application No. EP 21 19 7315 dated Jan. 25, 2022. 1 pg. (see p. 1, categorizing the cited references).

(Continued)

*Primary Examiner* — Gary W Estremsky
(74) *Attorney, Agent, or Firm* — Lerner David LLP

(57) ABSTRACT

A seal includes a barrel extending between a base and a top, in which the barrel has a cylindrical cavity passing through it between its base and its top, and a skirt indissociable from the barrel and extending around said barrel, in which the skirt adopts the shape of a dome of which the exterior edges extend out beyond the base starting from the top. The seal is able to divert the fluid and keep the space under the skirt fluid tight.

8 Claims, 4 Drawing Sheets

(56) References Cited

U.S. PATENT DOCUMENTS

| | | | |
|---|---|---|---|
| 10,612,660 B2* | 4/2020 | Yanagi | F16J 15/125 |
| 2009/0145078 A1* | 6/2009 | Herb | F16B 13/141 |
| | | | 52/396.02 |
| 2010/0001521 A1* | 1/2010 | Vandal | B23P 19/04 |
| | | | 285/337 |
| 2013/0187345 A1* | 7/2013 | Beagen, Jr. | F16L 17/04 |
| | | | 277/626 |
| 2017/0328473 A1* | 11/2017 | Kim | F16J 15/02 |
| 2018/0141635 A1* | 5/2018 | Nguyen | B64C 1/40 |
| 2020/0224696 A1* | 7/2020 | La Barbera | F16B 37/048 |

FOREIGN PATENT DOCUMENTS

| | | |
|---|---|---|
| FR | 1233869 A | 10/1960 |
| FR | 1322980 A | 4/1963 |
| FR | 2227468 A1 | 11/1974 |
| GB | 83340 A | 11/1961 |
| GB | 929176 A | 6/1963 |
| JP | 2008255975 A | 10/2008 |
| WO | 9835176 A1 | 8/1998 |
| WO | 2019108068 A2 | 6/2019 |

OTHER PUBLICATIONS

French Search Report for Application No. 2010254, dated Jun. 3, 2021, 2 pages.

* cited by examiner

[Fig. 1]
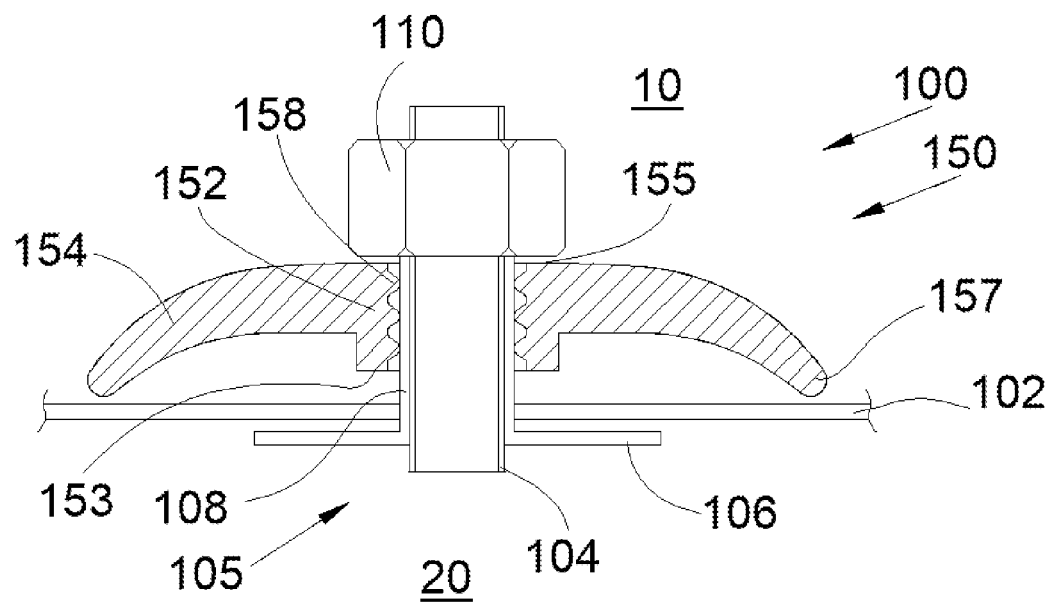
[Fig. 2]
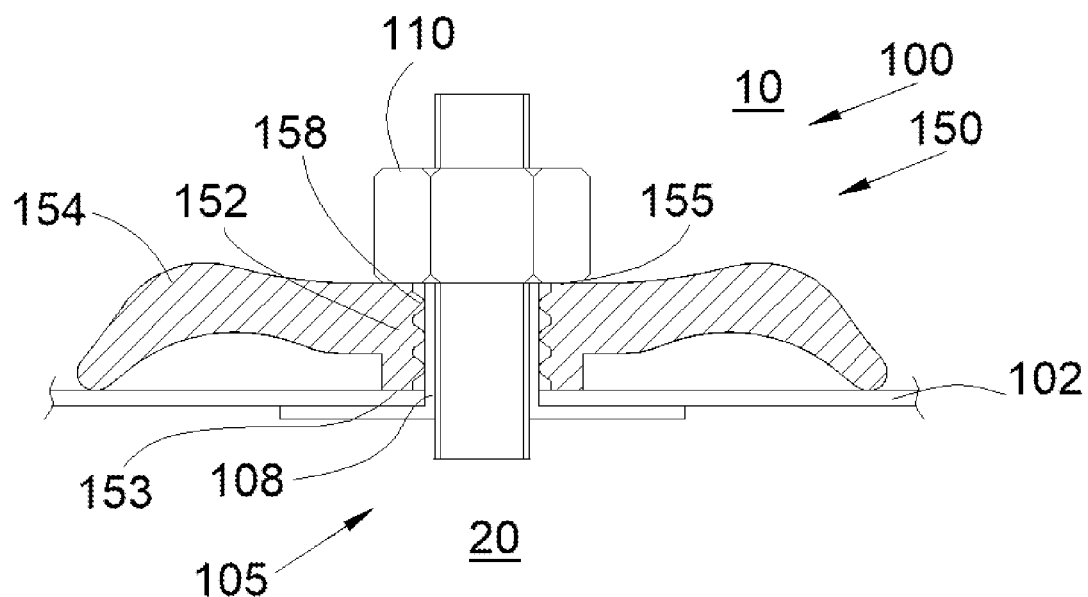

[Fig. 3]
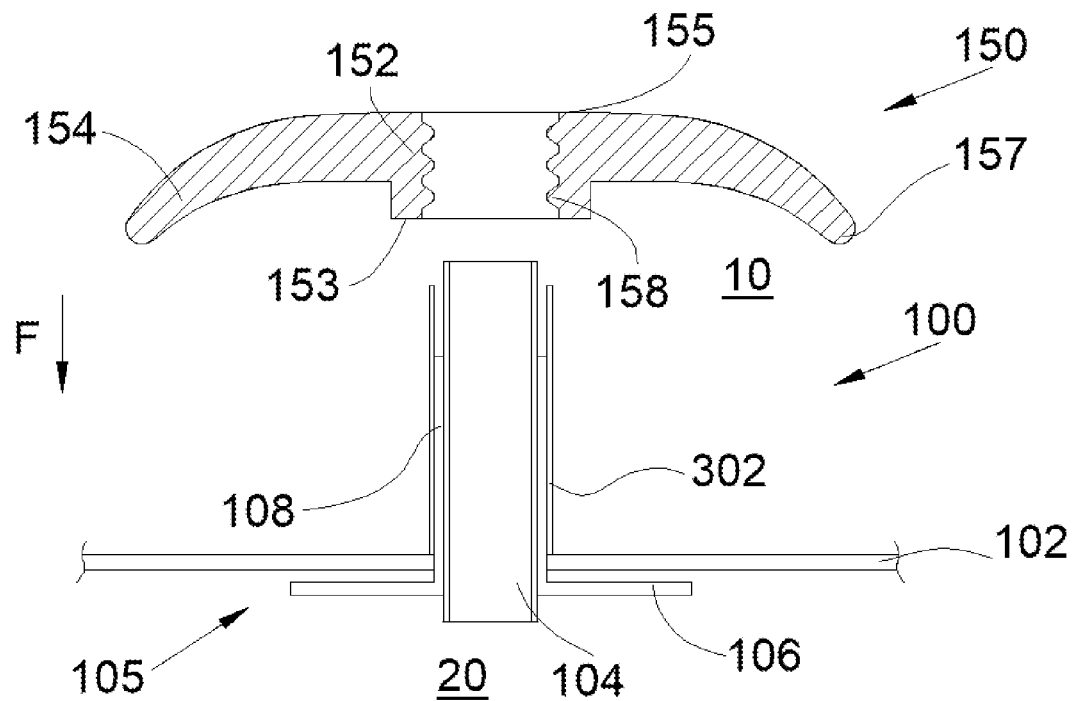
[Fig. 4]
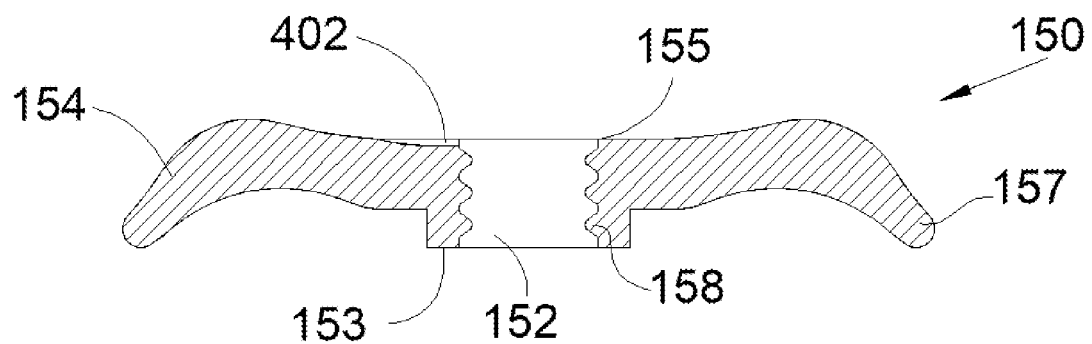

[Fig. 5]
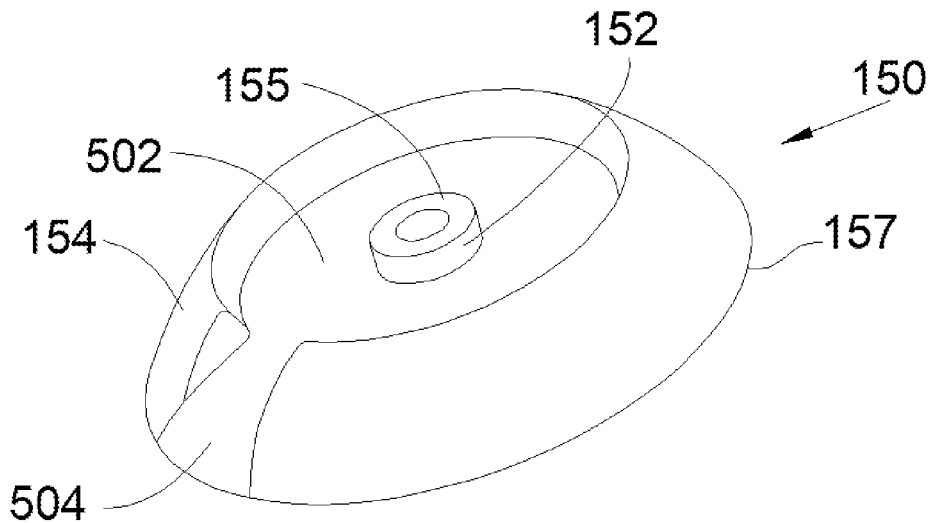
[Fig. 6]
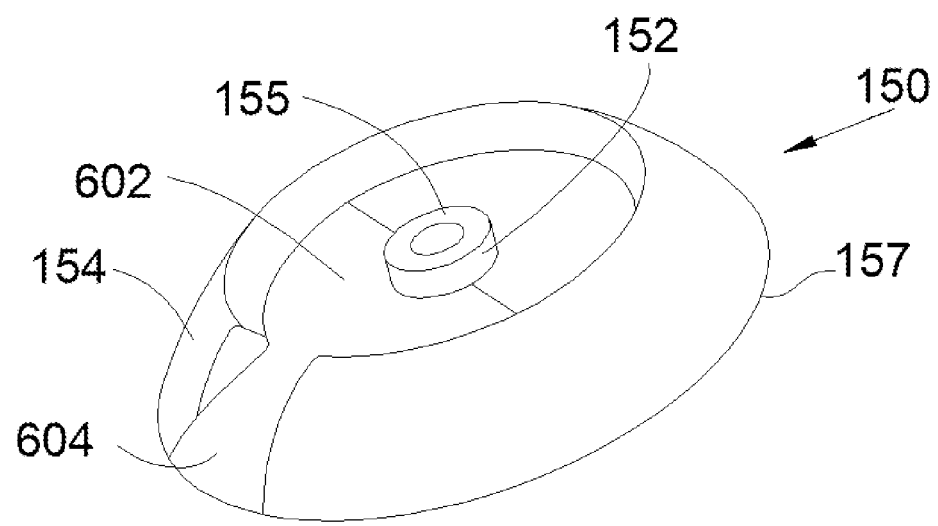

[Fig. 7]
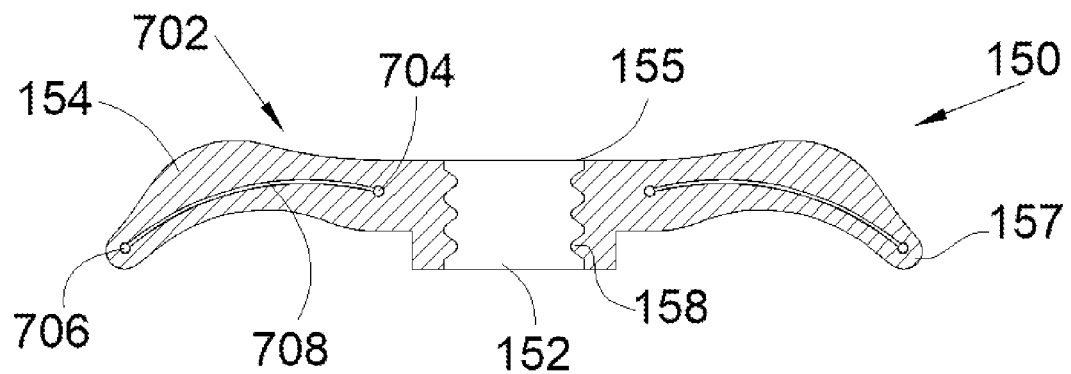
[Fig. 8]
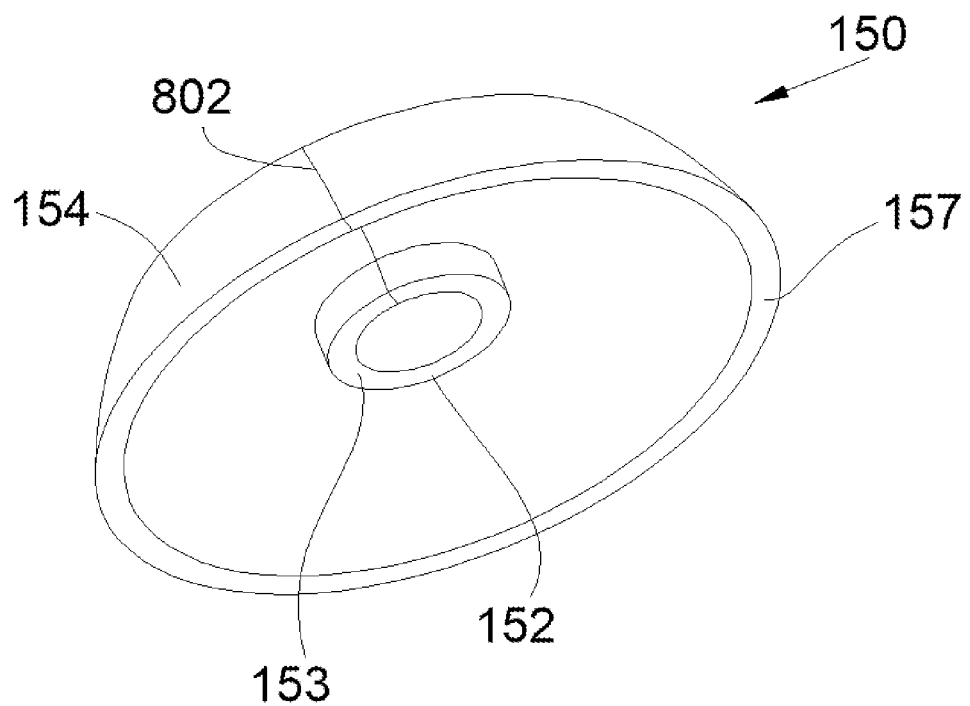

SEAL WITH SKIRT

FIELD OF THE INVENTION

The present invention relates to a seal with a skirt, to an assembly comprising such a seal, and to a method for assembling such an assembly.

BACKGROUND OF THE INVENTION

In various installations, such as in an aircraft for example, a pipe may penetrate through a wall separating two different compartments. In order to provide sealing at this penetration, there are a number of known solutions.

These solutions which are satisfactory are generally cumbersome to implement and require for example crimping elements onto the wall.

BRIEF SUMMARY OF THE INVENTION

It may therefore be necessary to find a seal which provides sealing around the orifice penetrating through the wall and which is used in a simple assembly.

An aspect of the present invention proposes a seal which has a skirt that comes into contact with the wall around the orifice that penetrates through said wall.

There is proposed a seal comprising:
a barrel extending between a base and a top, in which the barrel has a cylindrical cavity passing through it between its base and its top, and
a skirt indissociable from the barrel and extending around said barrel, in which the skirt adopts the shape of a dome of which the exterior edges extend out beyond the base starting from the top.

Such a seal is able to divert the fluid and keep the space under the skirt fluid tight.

Advantageously, the inside of the barrel exhibits a succession of toric bulges which line the interior of the cylindrical cavity.

Advantageously, the seal has, in the top of the barrel, a groove extending radially and opening into the cavity.

Advantageously, the skirt is attached some distance from the base and from the top and exhibits a depression around the barrel and a slope which extends from the depression as far as the exterior edges.

Advantageously, the skirt is attached some distance from the base and from the top and exhibits a depression around the barrel, a slope which extends from the depression as far as the exterior edges, and the depression has a bottom that slopes towards the slope over at least part of its bottom.

Advantageously, the seal comprises a lattice which is embedded inside the seal.

Advantageously, the lattice comprises a small ring which surrounds the barrel, a large ring which follows the exterior edges and a plurality of rods fixed between the small ring and the large ring.

Advantageously, the seal is slotted radially from the exterior edges as far as the cavity of the barrel.

An aspect of the invention also proposes an assembly comprising:
a wall pierced with an orifice,
a connector comprising a plate pierced with a hole and a bushing fixed to the plate around said hole and the exterior surface of which is threaded, in which the connector is arranged in such a way as to press the plate against the wall while the bushing is inserted into the orifice in the wall,
a pipe passing through the bushing,
a seal according to one of the preceding variants, in which the barrel is pushed home onto the bushing, with its base facing towards the wall, and
a nut screwed onto the bushing, sandwiching the barrel between the wall and the nut.

An aspect of the invention also proposes a method for assembling an assembly according to the preceding variant, said method consisting in:
a positioning step during which the connector is arranged in such a way as to insert the bushing into the orifice in the wall and press the plate against the wall,
a protecting step during which a flexible sheet is arranged around the screw thread of the bushing,
a pressing-home step during which the seal is pressed home around the flexible sheet, base first and towards the wall, until the base is against the wall,
a removal step during which the flexible sheet is removed, and
a tightening step during which the nut is screwed and tightened onto the bushing.

BRIEF DESCRIPTION OF THE DRAWINGS

The abovementioned features of the invention, together with others, will become more clearly apparent from reading the following description of one embodiment, said description being given in connection with the attached drawings, among which:

FIG. 1 is a side view in cross section of an assembly according to an embodiment of the invention in a non-tightened position, FIG. 2 is a view similar to FIG. 1, in a tightened position, FIG. 3 is a view similar to FIG. 1 during a step of a method for assembling the assembly according to an aspect of the invention, FIG. 4 is a view in section of the seal according to another embodiment of the invention, FIG. 5 is a perspective view of the seal according to another embodiment of the invention, FIG. 6 is a perspective view of the seal according to another embodiment of the invention, FIG. 7 is a view in section of the seal according to another embodiment of the invention, and FIG. 8 is a perspective view of the seal according to yet another embodiment of the invention.

DETAILED DESCRIPTION

FIG. 1 and FIG. 2 show an assembly 100 according to an embodiment of the invention. The assembly 100 comprises a wall 102 pierced with an orifice through which there passes a pipe 104. The wall 102 divides a space into a first volume 10 and a second volume 20.

The pipe 104 carries a fluid which may for example be a liquid or a gas.

In order to prevent a leak of fluid on one side (in this instance the first volume 10) of the wall 102 from flowing to the other side (in this instance the second volume 20) of the wall 102 through its orifice, the assembly 100 also comprises a connector 105 comprising a plate 106 and a hollow bushing 108 the exterior surface of which is threaded.

The plate 106 is pierced with a hole and the bushing 108 is indissociable from the plate 106 and attached around said hole.

The connector 105 is arranged in such a way as to press the plate 106 against the wall 102 on the side of the second volume 20 while the bushing 108 is inserted into the orifice in the wall 102 around the pipe 104 and so the pipe 104 passes through the bushing 108.

Of course, in order to limit the passage of fluid between the first volume 10 and the second volume 20, the dimensions of the orifice, of the bushing 108, of the pipe 104 and of the hole are tailored to leave the least possible amount of space between them while at the same time allowing the assembly 100 to be assembled and dismantled.

The assembly 100 also comprises a seal 150 made from a flexible material such as silicone for example.

The seal 150 comprises a barrel 152 which extends between a base 153 and a top 155. The barrel 152 has a cylindrical cavity passing through it between its base 153 and its top 155, and the cavity allows the barrel 152 to be pushed home around the bushing 108 with the base 153 offered up to face the wall 102. To ensure sealing between the bushing 108 and the barrel 152, the diameter of the barrel 152 is less than the diameter of the bushing 108. The difference in diameter needs to be sufficient to ensure sealing but, in order not to prevent the bushing 108 from entering the cavity, must not be too great. Because of the flexible nature of the seal 150, a slight expansion of the cavity is possible at the time of fitting.

The seal 150 also comprises a skirt 154 indissociable from the barrel 152 and extending around said barrel 152. The skirt 154 takes the form of a dome of which the exterior edges 157 are oriented towards the wall 102 and extend beyond the base 153 of the barrel 152 starting from the top 155. In other words, in the position of FIG. 1, when the skirt 154 is not subjected to any load, there is a difference in height between the base 153 and the exterior edges 157, and the exterior edges 157 come down lower than the base 153.

In the embodiment of FIGS. 1 to 3, the skirt 154 is indissociably attached to the barrel 152 at the top 155 thereof.

The assembly 100 also comprises a nut 110 which is screwed onto the bushing 108, allowing the pipe 104 to pass through it. The nut 110 sandwiches the barrel 152 between the wall 102 and the nut 110.

FIG. 1 shows the assembly 100 when the nut 110 is not tightened and FIG. 2 shows the assembly 100 when the nut 110 is tightened.

When the nut 110 is screwed down, the seal 150 moves down along the bushing 108. Because of the difference in height between the exterior edges 157 and the base 153, the exterior edges 157 are first to come into contact with the wall 102 and tightening is continued until the base 153 of the barrel 152 comes into contact with the wall 102.

After tightening, the exterior edges 157 press down against the wall 102, thus sealing around the bushing 108 and around the orifice in the wall 102 because of the tension induced in the skirt 154 as a result of contact with the wall 102. The exterior edges 157 have a teardrop shape in order to limit the risk of leakage through capillary action.

The assembly 100 is therefore relatively simple to create and to employ. Furthermore, should a fluid flow in the first volume 10, that fluid will flow along the skirt 154 until it reaches the wall 102 without flowing into the orifice in said wall 102. The seal 150 is able to divert the fluid and keep the space under the skirt 154 fluid tight.

A method for assembling the assembly 100 consists in:
 a positioning step during which the connector 105 is arranged in such a way as to insert the bushing 108 into the orifice in the wall 102 and press the plate 106 against the wall 102, namely so as to introduce the bushing 108 from the second volume 20 into the orifice in the wall 102,
 a protecting step, which is depicted in FIG. 3, during which a flexible sheet 302, such as a metal foil, is arranged around the screw thread of the bushing 108,
 a pressing-home step (arrow F) during which the seal 150 is pressed home around the flexible sheet 302, base 153 first and towards the wall 102, until the base 153 is against the wall 102,
 a removal step during which the flexible sheet 302 is removed, and
 a tightening step during which the nut 110 is screwed and tightened onto the bushing 108.

Such an assembly method means, amongst other things, that the screw thread can be protected during the positioning of the seal 150.

In order to improve the sealing tension of the barrel 152 around the bushing 108, the inside of the barrel 152 has a succession of toric bulges 158 which line the inside of the cylindrical cavity. The axis of each toric bulge 158 is coaxial with the axis of the cavity and of the screw thread of the bushing 108.

FIGS. 4 to 8 show different variants which here are set out individually in each figure but which may be combined with one another.

In FIG. 4, the seal 150 has, in the top 155 of the barrel 152, a groove 402 extending radially and opening into the cavity. Thus, in the event of a leak under the nut 110, the fluid can be discharged via the groove 402.

In FIG. 5, the skirt 154 is attached some distance from the base 153 and from the top 155 and exhibits a depression 502 around the barrel 152 to act as a reservoir if need be, and a slope 504 which extends from the depression 502 as far as the exterior edges 157 to guide the fluid contained in the reservoir to a dedicated location.

In FIG. 6, the skirt 154 is attached some distance from the base 153 and from the top 155 and has a depression 602 around the barrel 152 to act as a reservoir if need be, and a slope 604 which extends from the depression 602 as far as the exterior edges 157 to guide the fluid contained in the reservoir towards a dedicated location. The depression 602 also has a bottom that slopes towards the slope 604 over at least part of its bottom for more rapid removal of the fluid contained in the reservoir. In the embodiment of FIG. 6, the sloping bottom is present over half of the depression 602.

In FIG. 7, the seal 150 has a lattice 702, particularly one made of metal, which is embedded within the seal 150, for example by over moulding, to reinforce the structure and the force with which it bears against the wall 102. In the embodiment depicted in FIG. 7, the lattice 702 comprises a small ring 704 which surrounds the barrel 152, a large ring 706 which follows the exterior edges 157, and a plurality of rods 708 fixed between the small ring 704 and the large ring 706. The rods 708 are bowed in order to follow the curvature of the skirt 154.

In FIG. 8, the seal 150 is radially slotted from the exterior edges 157 as far as the cavity of the barrel 152 to facilitate positioning without the need to dismantle the assembly 100. The slot 802 extends only along a radius.

In order to hold the seal in place, a clamping collar may be fitted around the barrel 152 underneath the skirt 154, for example by inverting the skirt 154.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A seal comprising:
   a barrel extending between a base and a top, wherein the barrel has a cylindrical cavity passing therethrough between the base and the top;
   a skirt indissociable from the barrel and extending around said barrel, wherein the skirt adopts the shape of a dome of which the exterior edges extend out beyond the base starting from the top; and
   a lattice embedded inside the seal,
   wherein an inside of the barrel includes a succession of toric bulges which line the interior of the cylindrical cavity.

2. A seal comprising:
   a barrel extending between a base and a top, wherein the barrel has a cylindrical cavity passing therethrough between the base and the top;
   a skirt indissociable from the barrel and extending around said barrel, wherein the skirt adopts the shape of a dome of which the exterior edges extend out beyond the base starting from the top; and
   a lattice embedded inside the seal,
   wherein the seal has, in the top of the barrel, a groove extending radially and opening into the cylindrical cavity.

3. The seal according to claim 1, wherein the skirt is attached some distance from the base and from the top and includes a depression around the barrel and a slope which extends from the depression as far as the exterior edges.

4. The seal according to claim 1, wherein the skirt is attached at a distance from the base and from the top and includes a depression around the barrel, a slope which extends from the depression as far as the exterior edges, and wherein the depression has a bottom that slopes towards the slope over at least part of the bottom.

5. The seal according to claim 1, wherein the lattice comprises a smaller ring surrounding the barrel, a larger ring following the exterior edges and a plurality of rods fixed between the smaller ring and the larger ring.

6. A seal comprising:
   a barrel extending between a base and a top, wherein the barrel has a cylindrical cavity passing therethrough between the base and the top;
   a skirt indissociable from the barrel and extending around said barrel, wherein the skirt adopts the shape of a dome of which the exterior edges extend out beyond the base starting from the top; and
   a lattice embedded inside the seal,
   wherein the seal is slotted radially from the exterior edges as far as the cavity of the barrel.

7. An assembly comprising:
   a wall pierced with an orifice,
   a connector comprising a plate pierced with a hole and a bushing fixed to the plate around said hole and the exterior surface of which is threaded, in which the connector is arranged in such a way as to press the plate against the wall while the bushing is inserted into the orifice in the wall,
   a pipe passing through the bushing,
   a seal according to claim 1, wherein the barrel is pushed home onto the bushing, with the base facing towards the wall, and
   a nut screwed onto the bushing, sandwiching the barrel between the wall and the nut.

8. A method for assembling an assembly according to claim 7, said method comprising:
   a positioning step during which the connector is arranged in such a way as to insert the bushing into the orifice in the wall and press the plate against the wall,
   a protecting step during which a flexible sheet is arranged around the screw thread of the bushing,
   a pressing-home step during which the seal is pressed home around the flexible sheet, base first and towards the wall, until the base is against the wall,
   a removal step during which the flexible sheet is removed, and
   a tightening step during which the nut is screwed and tightened onto the bushing.

* * * * *